June 3, 1969 H. MAYER 3,447,807

APPARATUS FOR A THREE-PART RECORDING HEAD ARRANGEMENT

Filed April 19, 1966

INVENTOR
HEINZ MAYER

BY Percy P. Lantzy

ATTORNEY

United States Patent Office
3,447,807
Patented June 3, 1969

3,447,807
APPARATUS FOR A THREE-PART RECORDING HEAD ARRANGEMENT

Heinz Mayer, Kaufbeuren, Germany, assignor to International Standard Electric Corporation, New York, N.Y., a corporation of Delaware Filed Apr. 19, 1966, Ser. No. 543,608
Claims priority, application Germany, Apr. 23, 1965, St 18,588
Int. Cl. G11b 5/48
U.S. Cl. 274—4 2 Claims

ABSTRACT OF THE DISCLOSURE

A three-part recording head arrangement having three recording heads arranged on the slide of a track selector of a multi-track tape recorder, said slide being parallel to the running direction of the tape and being pressed by a spring in the direction of the magnetic tape. A two-arm lever is pivoted on said slide. One arm of the lever carries two recording heads on a rocker pivoted on said lever, and a third recording head is mounted on the other arm of the lever. The lever arm ratios are so chosen that the recording heads are applied to the tape with equal pressure by providing that the distance of the third head to the pivot of the lever arm is one-third the distance of the third head to the pivot of the rocker.

The present invention relates to apparatus for a three-part recording head arrangement on the slide of a track selector of a multi-track tape recorder pressing in a direction towards the magnetic tape.

It is known to arrange the combination of a recording and erasing head on the track selector of a multi-track tape recorder on a rocker in order to achieve in this way a uniform application pressure upon the tape.

In cases where more than two recording heads are provided, as is necessary for the stereo operation, and each of the recording heads is required to have the same pressure, a simple type of rocker is no longer sufficient.

The present innovation is based on providing a generally applicable solution, and is characterised by the fact that on the slide of the track selector, parallel in relation to the running direction of the tape, a two-arm lever is mounted in a hinged fashion. The one arm of this lever carries two recording heads on a rocker, and to the other arm of the lever there is mounted the third recording head. The innovation is further characterised by the fact that the relationships of the lever arm lengths of the two-arm lever and of the rocker, are chosen so that all recording heads are applied with the prescribed pressure.

Both the construction and the mode of operation of an example of embodiment of the apparatus according to the present innovation, will now be explained in detail with reference to FIGS. 1 and 2 of the accompanying drawing, in which.

Figure 1:
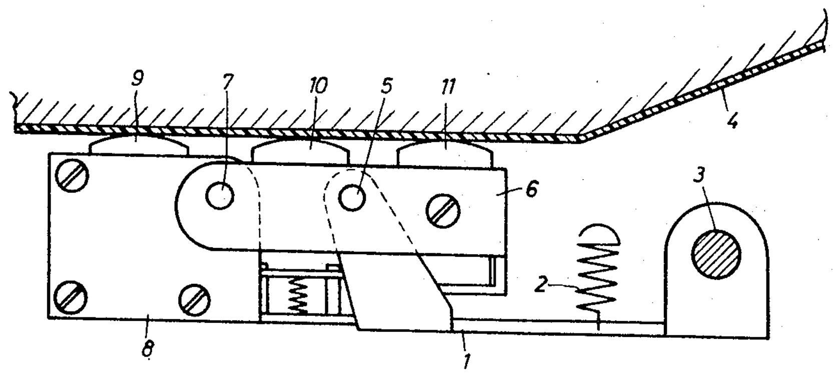
FIG. 1 shows a side view of the centers of rotation of the lever arms.

In FIG. 1 the reference numeral 1 indicates the slide or carriage of a track selector in a multi-track tape recorder which, by the action of a spring 2, and around the shaft 3, is pulled in direction towards the tape support 4. The tape itself is not shown in FIG. 1. About the journal 5 of the slide 1, a two-arm lever 6 is pivoted. At the one end of this lever, and at the centre of rotation 7, there is arranged a rocker 8. This rocker 8 carries two recording heads 9 and 10. The third one of the magnetic heads 11 (erase head) is firmly mounted to the lever 6.

If all of the recording heads (magnetic heads) are to be applied against the tape with the same pressure, then the lever arm ratio of the rocker 8 must be such that the distance of the centre lines of the recording heads 9 and 10 from the centre of rotation 7 is 1:1; and the ratio of two arm lever 6 carrying all magnetic heads must be such that the distance of the center of rotation 5 to the center line of the magnetic head 11 is one-third the distance of the center of rotation 7 to the center line of the magnetic head 11. In this arrangement, and when looked at from the centre of rotation 5, the third magnetic head is positioned at the shorter portion of the lever arm, and the rocker is positioned at the longer portion of the lever arm. In cases where different application pressures are required, the lever arm ratios will have to be chosen analagously in such a way that each time the magnetic head, which is supposed to have the higher applicatiton pressure, with respect to the centre of rotations 5 or 7, is to be arranged on the shorter lever arm.

Figure 2:
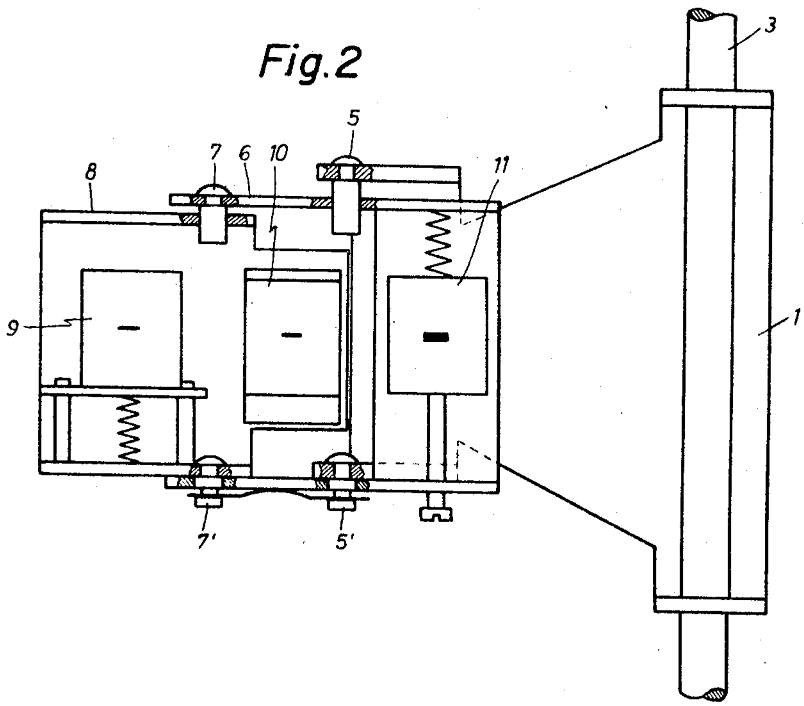
FIG. 2 shows a top view of the recording heads in FIG. 1.

In FIG. 2 identical parts are indicated by the same reference numerals as in FIG. 1. This drawing shows a view of the arrangement according to the innovation as looked at from the directiton of the tape support 4. It will be seen that in this particular example of embodiment the rocker 8 and the lever 6 are both designed as bails within which the magnetic heads are mounted adjustably and which, besides the centres of rotation 5 and 7, still contain the associated points 5' and 7'.

While I have described above the principles of my invention in connection with specific apparatus, it is to be clearly understood that this description is made only by way of example and not as a limitation to the scope of my invention.

I claim:

1. Apparatus comprising:

a carriage;

means pressing said carriage towards a magnetic tape support member;

a lever pivotally mounted on said carriage in substantially parallel relation to the direction of travel of the tape;

a rocker pivotally mounted on said lever at one side of the lever pivot;

a plurality of magnetic heads mounted on said rocker, the operative face of each head being adjacent to said tape support member and each head spaced on opposite sides of the pivot point of said rocker, the relative distance of each head from the pivot point of said rocker being predetermined; and an additional magnetic head mounted on said lever, the operative face thereof being adjacent to said tape support member, said additional head being mounted at the other side of said lever pivot, the ratios of a first distance between the additional magnetic head and the lever pivot and a second distance between the additional magnetic head and the rocker pivot being so chosen that each of the magnetic heads applies a desired pressure on said support member.

2. Apparatus according to claim 1, in which each of said plurality of magnetic heads is spaced an equal distance from said rocker pivot, and the ratio of said first distance to said second distance is one to three, so that each of said heads applies an equal pressure on said support member.

References Cited

UNITED STATES PATENTS 3,372,938 3/1968 Hoag ---------------- 274—4

ROBERT B. HULL, *Primary Examiner.*

ROGER A. FIELDS, *Assistant Examiner.*

U.S. Cl. X.R.

179—100.2